UNITED STATES PATENT OFFICE.

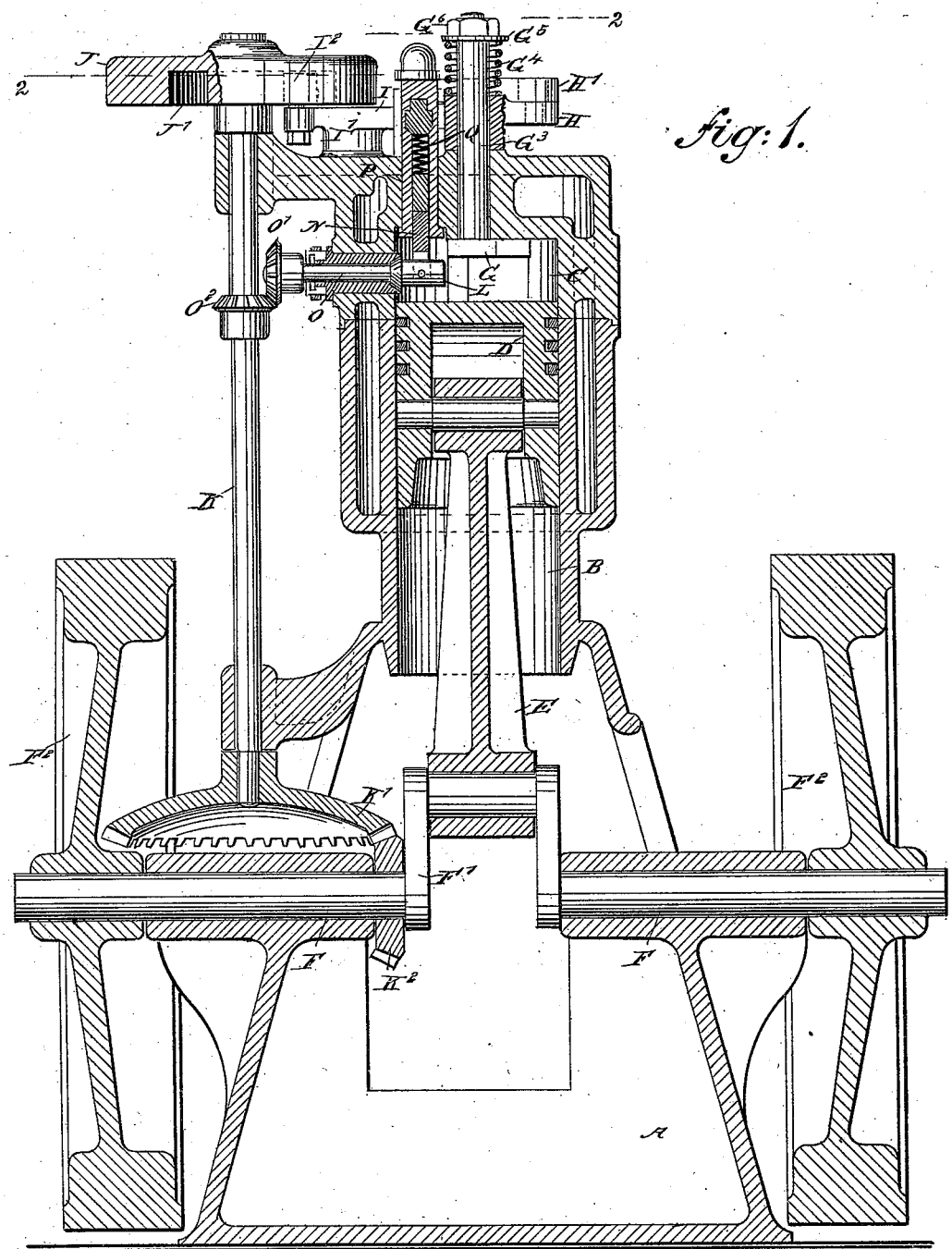

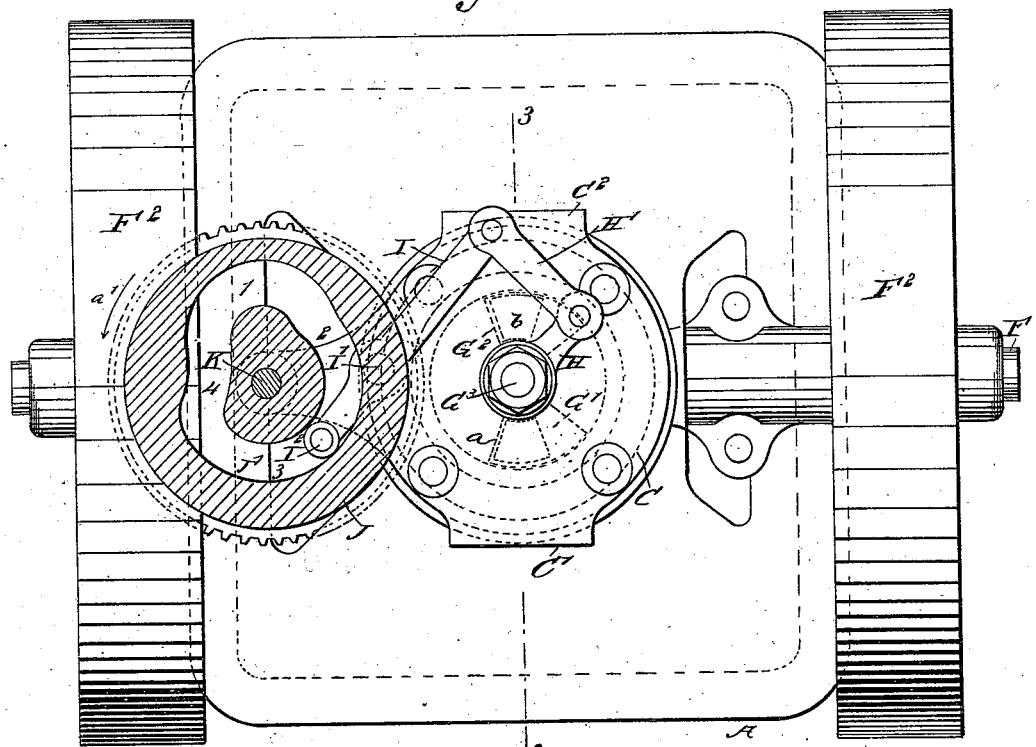

FREDERICK W. MELLARS, OF SAN FRANCISCO, CALIFORNIA.

GAS OR VAPOR ENGINE.

SPECIFICATION forming part of Letters Patent No. 556,195, dated March 10, 1896.

Application filed March 25, 1895. Serial No. 543,080. (No model.)

*To all whom it may concern:*

Be it known that I, FREDERICK W. MEL-LARS, of San Francisco, in the county of San Francisco and State of California, have invented a new and Improved Gas or Vapor Engine, of which the following is a full, clear, and exact description.

The invention relates to four-period gas-engines, and its object is to provide a new and improved gas or vapor engine which is comparatively simple and durable in construction, very effective in operation, and arranged to utilize the motive power to the fullest advantage.

The invention consists principally of a rocking valve controlling the gas-inlet and the exhaust and a cam for operating the said valve to hold the latter stationary during the compression and explosion period.

The invention also consists of certain parts and details and combinations of the same, as will be fully described hereinafter and then pointed out in the claims.

Reference is to be had to the accompanying drawings, forming a part of this specification, in which similar letters and numerals of reference indicate corresponding parts in all the figures.

Figure 1 is a sectional side elevation of the improvement. Fig. 2 is a sectional plan view of the same on the line 2 2 of Fig. 1. Fig. 3 is a transverse section of the explosion-chamber and valve, the section being taken on the line 3 3 of Fig. 2. Fig. 4 is a side elevation of the valve, and Fig. 5 is a plan view of the same.

The improved engine is provided with a suitably-constructed frame A, on which is cast or otherwise secured a cylinder B, provided at its upper end with an explosion-chamber C, having in its top a gas-inlet port $a$ and an exhaust-port $b$, located opposite the port $a$, as is plainly shown in Figs. 2 and 3.

In the cylinder B is mounted to reciprocate a piston D, connected by a pitman E with the crank-arm F' of the main driving-shaft F, journaled in suitable bearings in the frame A and carrying the fly-wheel pulleys $F^2$ for transmitting the rotary motion of the shaft to other machinery. A valve G controls the two ports $a$ and $b$ within the explosion-chamber C, and this valve G is provided with two wings $G'$ $G^2$, adapted to alternately open and close the ports $a$ and $b$.

The valve G is provided in its middle with a stem $G^3$, mounted to turn in suitable bearings in the head of the explosion-chamber C, and on the outer end of this stem is secured an arm H, connected by a link H' with a lever I, fulcrumed at I' on the top of the chamber C, and provided at its free end with a friction-roller $I^2$, engaging a cam-groove J', formed in the under side of a cam J, secured on the upper end of a shaft K, mounted to turn in suitable bearings and carrying at its lower end a bevel gear-wheel K' in mesh with a bevel-pinion $K^2$, secured on the shaft F.

A spring $G^4$ is coiled on the extreme upper end of the stem $G^3$, resting with its lower end on the arm H and with its upper end pressing against the under side of a washer $G^5$, held in place on the stem by a nut $G^6$. By this arrangement of the spring $G^4$ an upward pressure is exerted against the stem $G^3$ to hold the top surface of the wings $G'$ $G^2$ in proper contact with the under side of the head of the explosion-chamber C to prevent leakage at the ports $a$ and $b$.

The cam-groove J' in the cam J is formed of four distinct parts 1, 2, 3, and 4, of which the part 1 indicates the suction period, the part 2 the compression period, the part 3 the expansion period, and the part 4 the exhausting period. The parts 2 and 3 are concentric to the shaft K, so that when the latter is rotated in the direction of the arrow $a'$ (shown in Fig. 2) then the lever I remains stationary during the time the friction-roller $I^2$ passes through the parts 2 and 3, and consequently the valve G remains stationary and in a closed position over both the ports $a$ and $b$ during the compression and expansion periods.

It is understood that the pinion $K^2$ and the gear-wheel K' are arranged in such a manner that the shaft F makes two revolutions to one revolution of the cam J.

The igniting device for the gas-engine is arranged in the explosion-chamber C, and is preferably provided with two electrodes L and N, of which the electrode L is secured on the inner end of a horizontally-disposed shaft O, journaled in a rubber or other non-conducting bushing in the side of the explosion-chamber C. The outer end of the shaft O carries a bevel gear-wheel O' in mesh with a bevel gear-wheel O² attached to the shaft K. Thus when the latter is rotated the rotary motion is transmitted by the bevel gear-wheels O² and O' to the shaft O and to the electrode L. The electrode N is disposed vertically directly above the electrode L and is in frictional contact therewith. The said electrode N is fitted to slide in a suitable bushing P, pressed on by a spring Q, to hold the two electrodes constantly in contact. A spark is produced at the proper time by the electrodes to ignite the explosive mixture.

The operation is as follows: When the several parts are in the position shown in Fig. 1 the piston D is on the downstroke after the period of compression, and both wings G' and G² of the valve are closed over the ports $a$ and $b$, as indicated in dotted lines in Fig. 2. An ignition of the explosive mixture in the chamber C now takes place to force the piston D downward, and on the return stroke of the piston D the friction-roller I² enters the exhaust portion 4 of the cam-groove J', whereby the valve G is turned so that the wing G² of the valve G opens the port $b$, while the wing G' still closes the port $a$. When the piston D has now moved into an uppermost position and the exhaust is finished, the friction-roller I² passes into part 1 of the cam-groove J', whereby the valve G is again actuated to cause the wing G² to close the port $b$ and to move the wing G' from the port $a$ to open the latter. The explosive mixture can now pass into the chamber C as the piston D is now drawn downward. During the suction period the gas is drawn in to fill the cylinder to be compressed on the return stroke of the piston and then ignited in the manner above described.

Having thus fully described my invention, I claim as new and desire to secure by Letters Patent—

1. A gas or vapor engine provided with a rocking valve adapted to open and close the gas inlet and exhaust, and a cam for operating the said valve, the said cam during the part of its revolution corresponding to the compression and expansion periods of the engine, holding the valve stationary and in a closed position over both inlet and exhaust, substantially as shown and described.

2. A gas or vapor engine provided with a cylinder, an explosion-chamber at the upper end of the said cylinder, having an inlet-port and an exhaust-port in its top, an oscillating valve having wings adapted to open and close the said ports, and a cam for operating the said valve, the said cam being adapted to hold the valve stationary and in a closed position over both inlet and exhaust during the compression and expansion periods, substantially as shown and described.

3. A gas or vapor engine, comprising a cylinder, a piston operating within the cylinder, an explosion-chamber at the upper end of the said cylinder and provided with an inlet-port and an exhaust-port, an oscillating valve adapted to open and close the said ports, a rocking lever connected with the said valve, and a cam provided with a groove engaged by the said lever for operating the valve, the portion of the said groove corresponding to the compression and expansion periods of the engine being concentric with the cam-shaft whereby the lever remains stationary and the valve is held in a closed position over both inlet and exhaust during the said compression and expansion periods, substantially as shown and described.

4. A gas or vapor engine, comprising a cylinder, a piston operating within the cylinder and connected with the main driving-shaft, an explosion-chamber at the upper end of the said cylinder and provided in its top with an inlet and an exhaust port, a valve mounted to turn and having two wings adapted to open and close the said ports, an arm secured on the stem of the said valve, a lever mounted to rock and connected by a link with the said arm, and a cam mounted to rotate and driven from the main driving-shaft, the said cam being provided with a cam-groove engaged by a friction-roller on the said lever, and having four parts indicating the suction, compression, expansion and exhaust periods, substantially as shown and described.

5. A gas or vapor engine, comprising a cylinder, a piston operating within the cylinder and connected with the main driving-shaft, an explosion-chamber at the upper end of the said cylinder and provided in its top with an inlet and an exhaust port, a valve mounted to turn and having two wings adapted to open and close the said ports, an arm secured on the stem of the said valve, a lever mounted to rock and connected by a link with the said arm, a cam mounted to rotate and driven from the main driving-shaft, the said cam being provided with a cam-groove engaged by a friction-roller on the said lever and having four parts indicating the suction, compression, expansion and exhaust periods, and a spring for holding the said valve in contact with the under side of the head of the explosion-chamber, substantially as shown and described.

FREDERICK W. MELLARS.

Witnesses:
AMIEL H. BROD,
FRANK PRATT.